(12) United States Patent
Kato

(10) Patent No.: US 11,966,803 B2
(45) Date of Patent: Apr. 23, 2024

(54) RFIC MODULE AND RFID TAG

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 99 days.

(21) Appl. No.: 17/659,081

(22) Filed: Apr. 13, 2022

(65) Prior Publication Data

US 2022/0237427 A1   Jul. 28, 2022

Related U.S. Application Data

(63) Continuation of application No. PCT/JP2020/034003, filed on Sep. 8, 2020.

(30) Foreign Application Priority Data

Dec. 17, 2019   (JP) .................................. 2019-227113

(51) Int. Cl.
G06K 19/077    (2006.01)
H01Q 1/22      (2006.01)
H01Q 7/00      (2006.01)

(52) U.S. Cl.
CPC .   *G06K 19/07771* (2013.01); *G06K 19/07747* (2013.01); *G06K 19/07773* (2013.01); *H01Q 1/2208* (2013.01); *H01Q 7/00* (2013.01)

(58) Field of Classification Search
CPC ....... G06K 19/07771; G06K 19/07773; G06K 19/07747; G06K 19/07; G06K 7/00; H01Q 7/00

USPC ................................. 235/492, 487, 375, 380
See application file for complete search history.

(56) References Cited

U.S. PATENT DOCUMENTS

| 2007/0090955 | A1* | 4/2007 | Cote ................ G06K 19/07718 340/572.5 |
| 2011/0122041 | A1 | 5/2011 | Morishita et al. |
| 2011/0220724 | A1* | 9/2011 | Sakama .................. H01Q 9/24 216/13 |
| 2017/0083804 | A1 | 3/2017 | Kato et al. |

(Continued)

FOREIGN PATENT DOCUMENTS

| JP | 2016062496 A | 4/2016 |
| JP | 2019009661 A | 1/2019 |

(Continued)

OTHER PUBLICATIONS

International Search Report issued for PCT/JP2020/034003 dated Dec. 8, 2020.

*Primary Examiner* — Edwyn Labaze
(74) *Attorney, Agent, or Firm* — Arentfox Shiff LLP

(57) ABSTRACT

An RFIC module is provided that includes a base material having a first face and a second face opposite to each other, an RFIC mounted above the first face of the base material, and RFIC-side terminal electrodes that are formed on the first face of the base material and are connected to the RFIC. An insulator film is formed on the surface of the RFIC-side terminal electrode, and conductor films facing the RFIC-side terminal electrode are formed on the insulator film. Moreover, additional capacitances are formed between the RFIC-side terminal electrodes and the conductor films.

20 Claims, 10 Drawing Sheets

(56) References Cited

U.S. PATENT DOCUMENTS

2018/0114104 A1  4/2018  Kato et al.
2018/0263827 A1* 9/2018  Omori ................ G06K 19/0717

FOREIGN PATENT DOCUMENTS

WO    2010013610 A1   2/2010
WO    2016084658 A1   6/2016

* cited by examiner

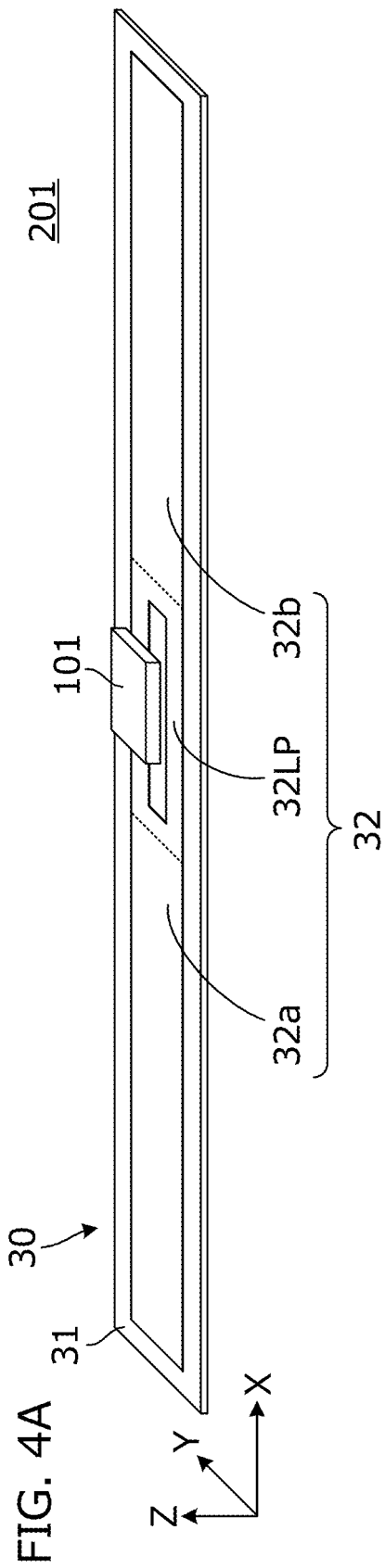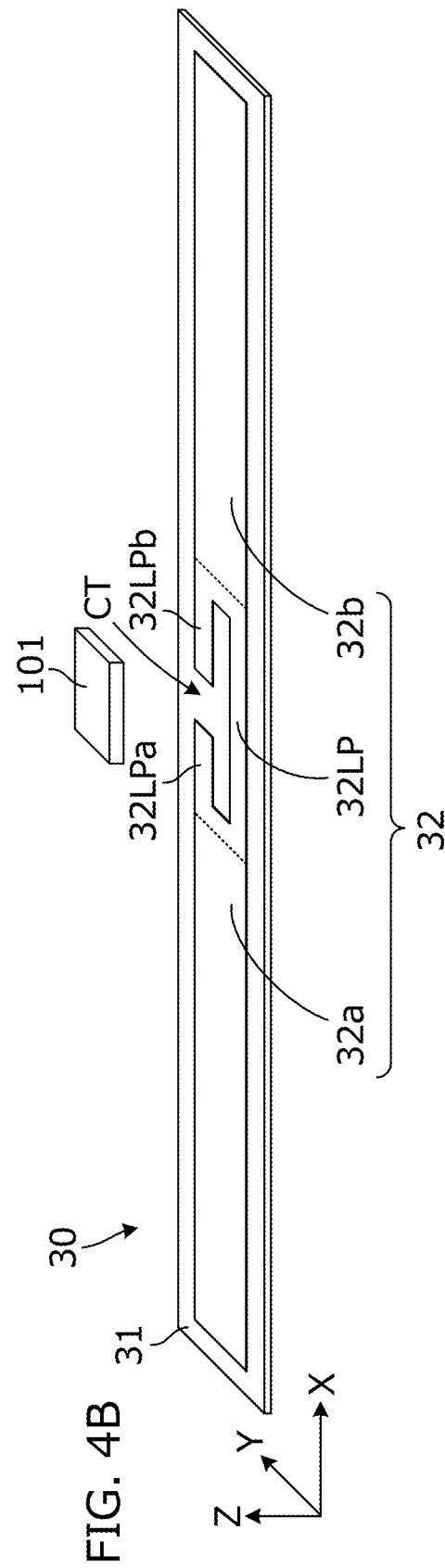

RFIC MODULE AND RFID TAG

CROSS REFERENCE TO RELATED APPLICATIONS

The present application is a continuation of PCT/JP2020/034003 filed Sep. 8, 2020, which claims priority to Japanese Patent Application No. 2019-227113, filed Dec. 17, 2019, the entire contents of each of which are incorporated herein by reference.

TECHNICAL FIELD

The present invention relates to a radio frequency integrated circuit (RFIC) module and a radio frequency identifier (RFID) tag including the RFIC module.

BACKGROUND

An RFID system including an RFID tag attached to an article and a reader/writer that performs reading and writing for the RFID tag is used as an article information management system.

WO 2016/084658 A (hereinafter "Patent Literature 1") discloses an RFID tag including a conductor acting as an antenna and an RFIC module coupled to the conductor.

The RFID tag disclosed in Patent Literature 1 includes an RFIC chip that stores predetermined information and processes a predetermined radio signal, and an antenna element (e.g., a radiator) that transmits and receives a high-frequency signal, and is used by being affixed to various articles or packaging materials thereof to be managed.

There are a variety of articles to be managed, and its range is expanding. However, in the case of a small-sized article, the RFID tag is relatively large with respect to the article, and in some cases, an attaching method of the RFID tag to the article is an issue.

In addition, the RFIC is mounted on the RFIC module used for the RFID tag, and the electrical characteristics of the RFIC may differ depending on the IC manufacturer. In this case, it is necessary to properly select an impedance matching circuit suitable for each RFIC to be used.

SUMMARY OF THE INVENTION

Accordingly, it is an object of the present invention to provide an RFIC module with a downsized RFID tag, and an RFID tag including the RFIC module. Moreover, it is an object of the present invention to provide an RFIC module that easily copes with a difference in electrical characteristics of RFIC to be used, and an RFID tag including the RFIC module.

In an exemplary aspect, an RFIC module is provided that includes a base material including a first face and a second face opposite to each other, an RFIC mounted near and/or above the first face of the base material, and an RFIC-side terminal electrode provided on the first face of the base material and connected to the RFIC. Moreover, an insulator film is provided on a surface of the RFIC-side terminal electrode, and a conductor film facing the RFIC-side terminal electrode is provided on the insulator film.

With this configuration, a capacitance is formed between the RFIC-side terminal electrode and the conductor film facing each other with the insulator film interposed therebetween, and the capacitance is connected to the RFIC. Therefore, such a structure is configured to act as the RFIC to which the capacitance is added, the inductance component required for the impedance matching unit between the RFIC and the antenna can be reduced, and thereby the RFID tag can be downsized as a whole. In addition, for example, even when an RFIC having a different internal capacitance component is used for each manufacturer, desired electrical characteristics can be obtained only by changing the conductor film according to the capacitance component.

In an exemplary aspect, an antenna-side terminal electrode can be provided on the second face of the base material, and an interlayer connection conductor connecting the RFIC-side terminal electrode and the antenna-side terminal electrode can be provided on the base material.

Moreover, an RFIC module in an exemplary aspect includes a base material including a first face and a second face opposite to each other, an RFIC mounted near and/or above the first face of the base material, and an RFIC-side terminal electrode provided on the first face of the base material and connected to the RFIC. Moreover, a conductor film facing the RFIC-side terminal electrode is provided on the second face of the base material.

In yet another exemplary aspect, an RFID tag is provided that includes an antenna and an RFIC module. The antenna includes an antenna base material and an antenna conductor pattern provided on the antenna base material, and the RFIC module includes the above described configuration(s).

According to the exemplary aspects of the present invention, an RFIC module with reduced size of an RFID tag and an RFID tag including the RFIC module are obtained. In addition, according to the present invention, an RFIC module and be provided that easily copes with a difference in electrical characteristics of RFIC to be used and an RFID tag including the RFIC module is also provided.

BRIEF DESCRIPTION OF DRAWINGS

FIG. 4A is a perspective view of an RFID tag 201. FIG. 4B is a perspective view before the RFIC module 101 is mounted on an antenna 30.

DETAILED DESCRIPTION OF EMBODIMENTS

Figure 1A:
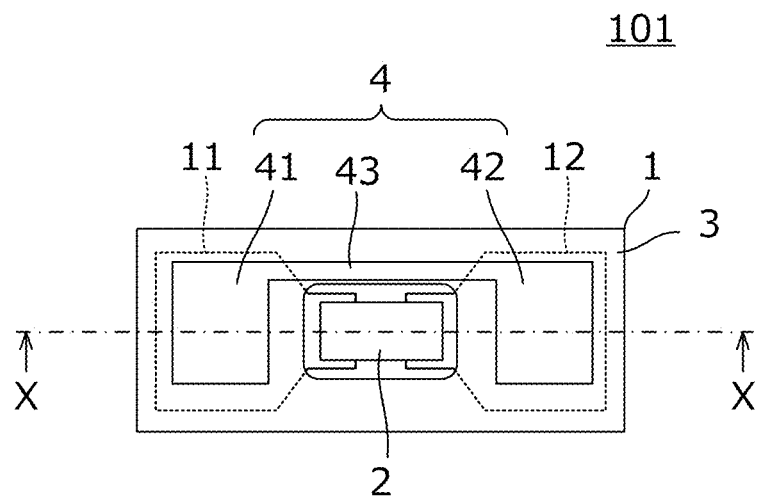
FIG. 1A is a plan view of an RFIC module 101 according to a first exemplary embodiment.

Hereinafter, a plurality of exemplary aspect of the present invention will be described with some specific examples with reference to the drawings. In the drawings, the same portions are denoted by the same reference numerals. In consideration of the description of the main points or ease of understanding, the exemplary embodiment is divided into a plurality of embodiments/aspects for convenience of description, but partial replacement or combination of configurations shown in different embodiments is possible in alternative aspects. In the second and subsequent embodiments, descriptions of matters common to the first embodiment will be omitted, and only different points will be described. Specifically, the same operation and effect by the same configuration will not be sequentially mentioned for each subsequent embodiment.

First Exemplary Embodiment

Figure 1B:
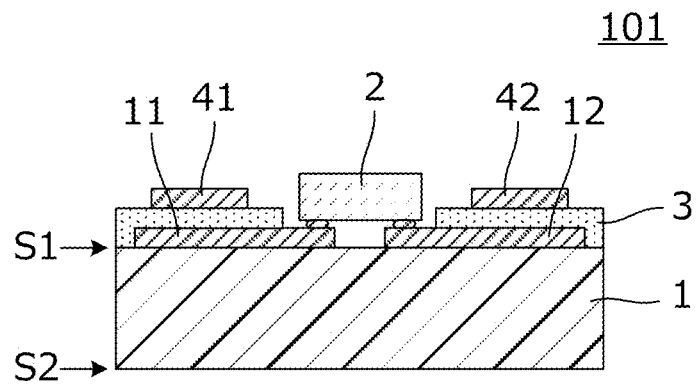
FIG. 1B is a longitudinal sectional view taken along line X-X in FIG. 1A.

FIG. 1A is a plan view of an RFIC module 101 according to the first exemplary embodiment, and FIG. 1B is a longitudinal sectional view taken along line X-X in FIG. 1A.

As shown, the RFIC module 101 includes a base material 1 having a first face S1 and a second face S2 opposite to each other, an RFIC 2 mounted near and/or above the first face S1 of the base material 1, and RFIC-side terminal electrodes 11 and 12 which are formed on the first face S1 of the base material 1 and to which the RFIC 2 is connected. In an exemplary aspect, the base material 1 is, for example, a sheet of polyethylene terephthalate (PET) or polyimide (PI). Moreover, the RFIC-side terminal electrodes 11 and 12 are, for example, patterned Cu foils.

An insulator film 3 is formed on the surface of each of the RFIC-side terminal electrodes 11 and 12. In this example, an opening is formed in the insulator film 3 to define a mounting position of the RFIC 2. A conductor film 4 is formed on the insulator film 3. The conductor film 4 includes conductor films 41 and 42 facing the RFIC-side terminal electrodes 11 and 12, and a conductor film 43 connecting the conductor film 41 and the conductor film 42. The insulator film 3 is, for example, various resist films of epoxy type, polyester type, or the like, and is formed by, for example, printing. Furthermore, the conductor film 4 is formed by printing and heating and curing Ag paste. Alternatively, conductor film 4 is formed by Cu plating in another exemplary aspect.

The RFIC 2 has two terminal electrodes that are connected to the RFIC-side terminal electrodes 11 and 12 by soldering or the like. Since the RFIC-side terminal electrode 11 and the conductor film 41 face each other with the insulator film 3 interposed therebetween, capacitance is generated between the RFIC-side terminal electrode 11 and the conductor film 41. Similarly, since the RFIC-side terminal electrode 12 and the conductor film 42 face each other with the insulator film 3 interposed therebetween, capacitance is generated between the RFIC-side terminal electrode 12 and the conductor film 42.

Figure 2A:
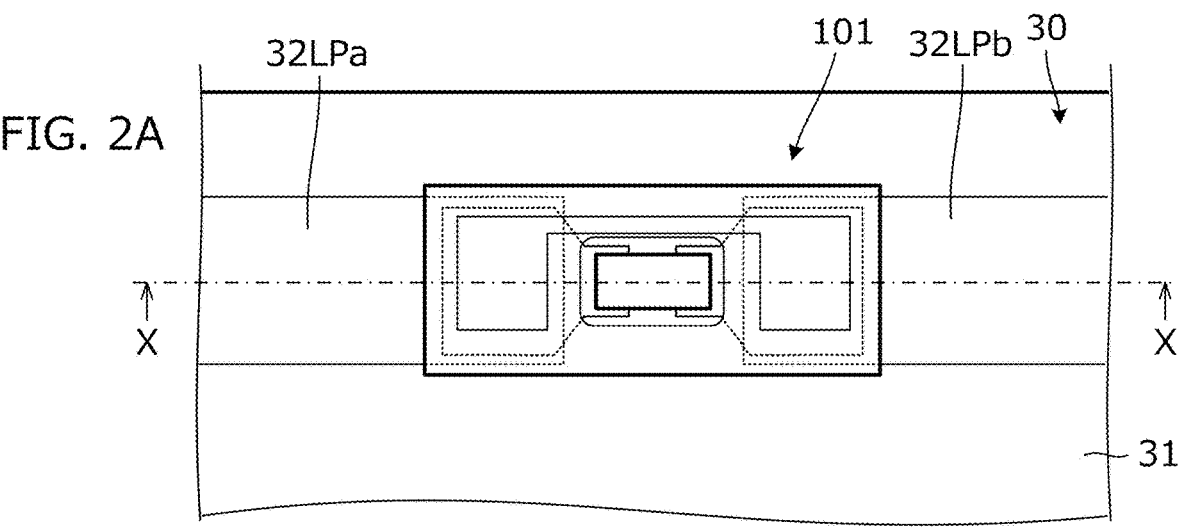
FIG. 2A is a plan view of the RFIC module 101 mounted on an antenna 30.
Figure 2B:
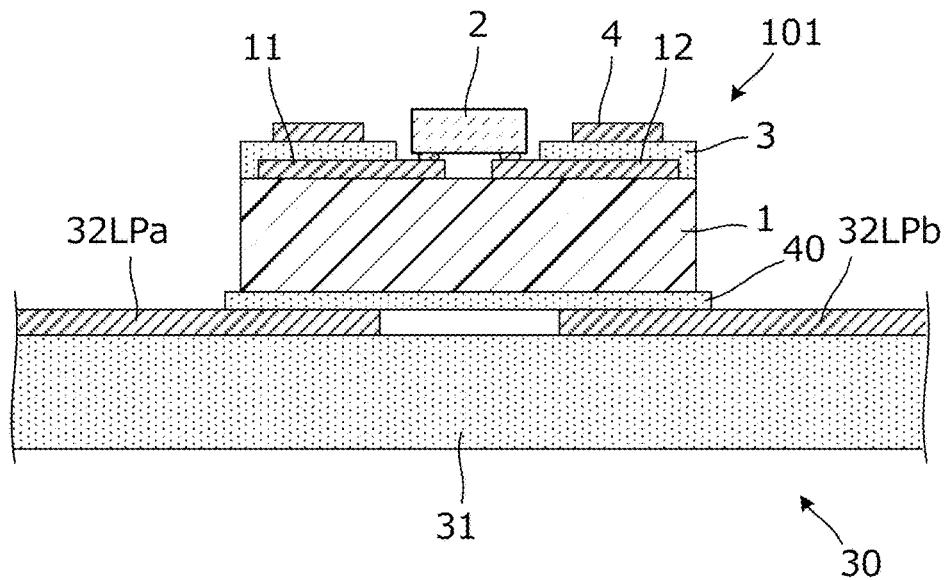
FIG. 2B is a longitudinal sectional view taken along line X-X in FIG. 2A.

FIG. 2A is a plan view of an RFIC module 101 mounted on an antenna 30. FIG. 2B is a longitudinal sectional view taken along line X-X in FIG. 2A. The antenna 30 includes an antenna base material 31 and a conductor pattern formed on the antenna base material 31. The entire conductor pattern formed on the antenna base material 31 will be described later.

In FIGS. 2A and 2B, the ends of antenna conductors 32LPa and 32LPb face each other along the face of the antenna base material 31. The RFIC module 101 is mounted at a position where the antenna conductors 32LPa and 32LPb face each other. In this example, the lower face of the RFIC module 101 (i.e., the lower face of the base material 1) is bonded on the antenna base material 31 (i.e., on the antenna conductors 32LPa and 32LPb) via a bonding material 40. The bonding material 40 is, for example, an insulating adhesive in an exemplary aspect.

Since the base material 1 is thicker than the bonding material 40, variations in the values of capacitances Ca and Cb generated when the RFIC-side terminal electrodes 11 and 12 and the antenna conductors 32LPa and 32LPb face each other can be adjusted not by the thickness of the bonding material 40, but by the thickness of the base material 1. Since the thickness of the base material 1 can be adjusted by about ±1 μm, variations in the values of the capacitances Ca and Cb can be easily reduced/adjusted. This enables antenna design in consideration of the capacitances Ca and Cb, and enables antenna design even when the values of the capacitances Ca and Cb are reduced. Specifically, the planar outer dimension of the RFIC module 101 can be reduced to about 3.2×2.5 mm, and the values of the capacitances Ca and Cb can be set to 2 pF or less. Such downsizing of the RFIC module 101 enables the RFIC module 101 to be mounted on the antenna 30 with a chip mounter. This significantly improves the mounting speed of the RFIC module 101.

Figure 3:
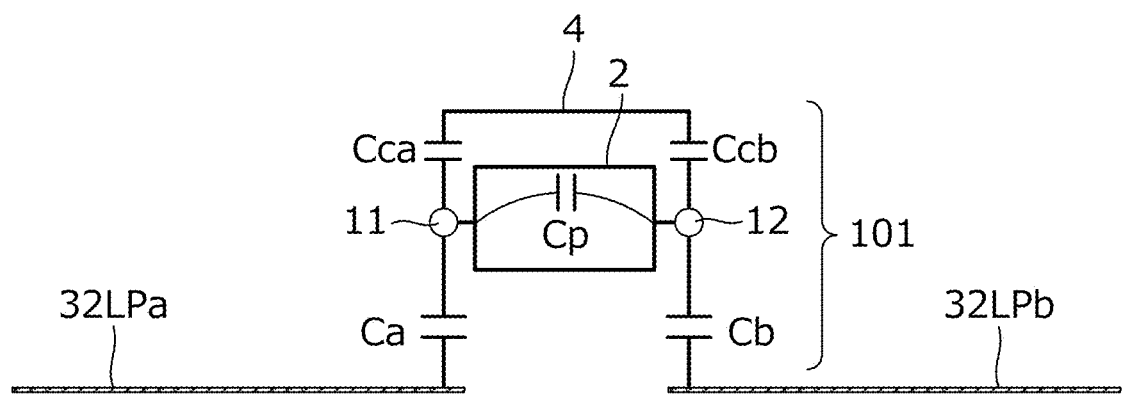
FIG. 3 is a partial equivalent circuit diagram in a state where the RFIC module 101 is mounted on the antenna 30.

FIG. 3 is a partial equivalent circuit diagram in a state where the RFIC module 101 is mounted on the antenna 30. Additional capacitances Cca and Ccb are connected via the conductor film 4 between two terminals of the RFIC 2. The additional capacitances Cca and Ccb are capacitances generated between the RFIC-side terminal electrodes 11 and 12 and the conductor film 4. Capacitances Ca and Cb are connected between the two terminals of the RFIC 2 and the antenna conductors 32LPa and 32LPb, respectively. As described above, the capacitances Ca and Cb are capacitances generated between the RFIC-side terminal electrodes 11 and 12 and the antenna conductors 32LPa and 32LPb, respectively.

There is an equivalent capacitance Cp between the two terminals of the RFIC 2. The series circuit of the additional capacitances Cca and Ccb is connected in parallel to the capacitance Cp. Therefore, the capacitance between the two terminals of the RFIC increases by the series combined capacitance due to the presence of the additional capacitances Cca and Ccb.

FIG. 4A is a perspective view of an RFID tag 201. FIG. 4B is a perspective view before the RFIC module 101 is mounted on the antenna 30. The RFID tag 201 is configured by mounting the RFIC module 101 on the antenna 30.

The antenna 30 includes an antenna base material 31 and an antenna conductor pattern 32 formed on the antenna base material 31. The antenna conductor pattern 32 includes belt-shaped antenna conductors 32a and 32b and a loop-shaped antenna conductor 32LP partially having a cutout portion CT. In FIGS. 4A and 4B, two broken lines are virtual lines indicating boundaries between the antenna conductors 32a and 32b and the antenna conductor 32LP. In an exemplary aspect, antenna base material 31 is a flexible insulator sheet made of, for example, polyethylene terephthalate (PET) resin or polyphenylene sulfide (PPS) resin. The antenna conductor pattern 32 is a thin conductor exhibiting flexibility, such as an aluminum foil or a copper foil.

The length of the loop-shaped antenna conductor 32LP in the X direction is larger than the length of the RFIC module 101. The loop-shaped antenna conductor 32LP acts as an inductor for impedance matching.

Figure 5:
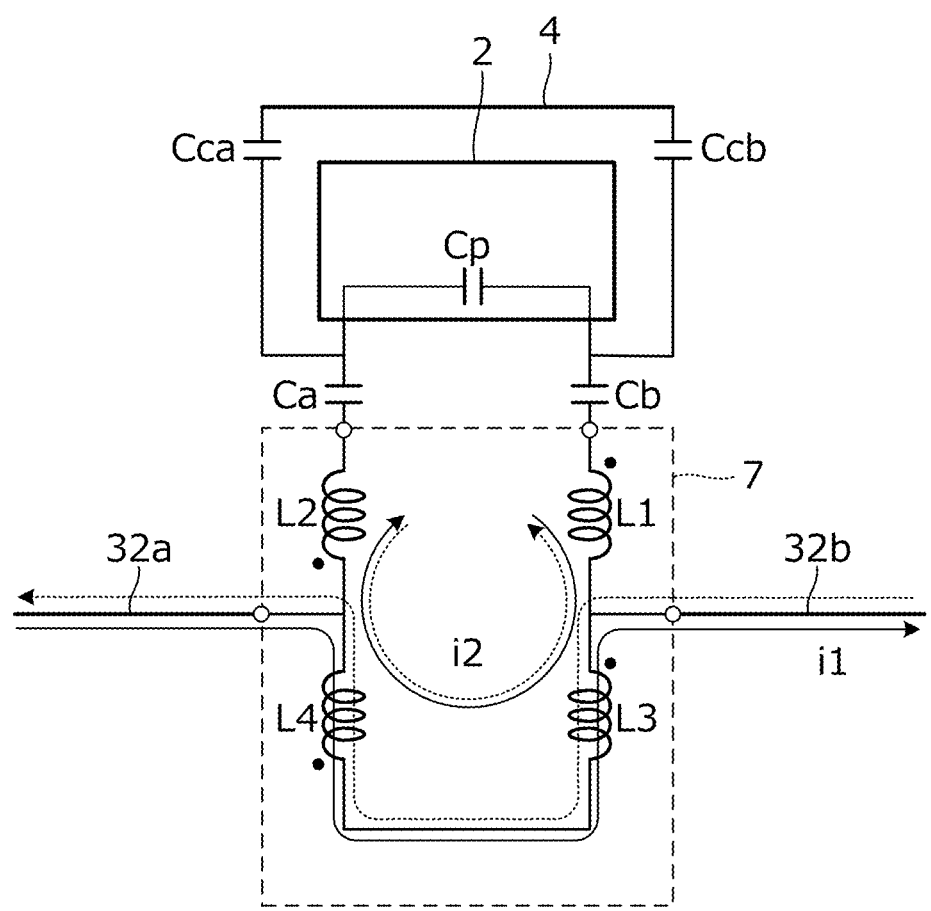
FIG. 5 is a circuit diagram illustrating a relationship between an RFIC 2, an impedance matching circuit 7, and antenna conductors 32a and 32b.
Figure 6:
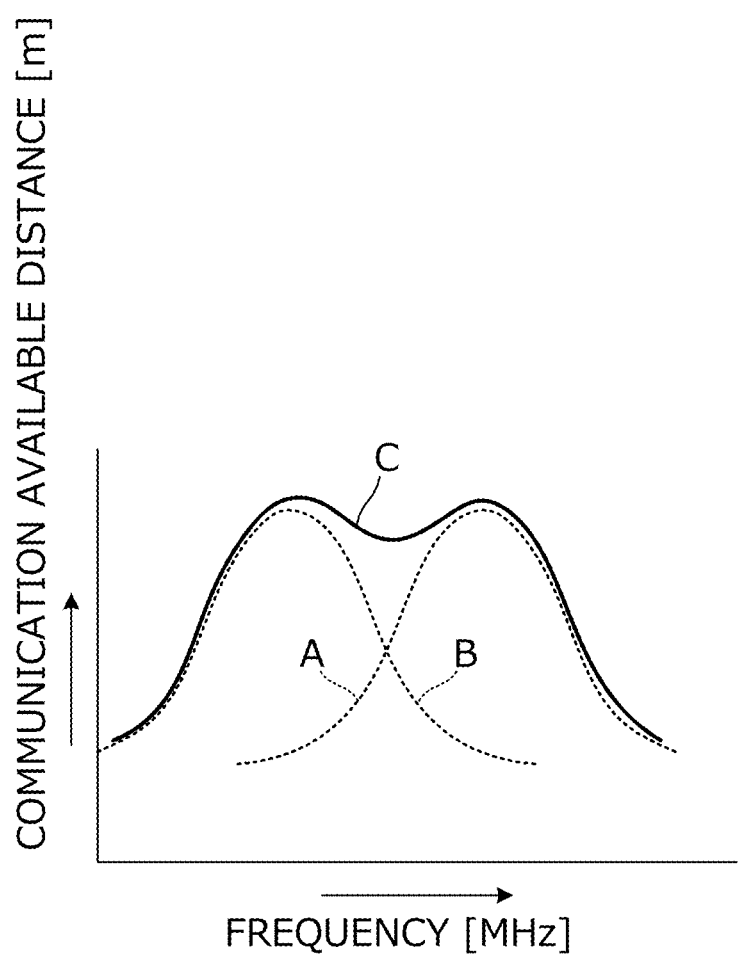
FIG. 6 is a diagram illustrating two resonance frequencies generated by the impedance matching circuit.

FIG. 5 is a circuit diagram illustrating a relationship between the RFIC 2, the impedance matching circuit 7, and the antenna conductors 32a and 32b. FIG. 6 is a diagram illustrating two resonance frequencies generated by the impedance matching circuit.

The antenna conductor 32LP illustrated in FIG. 4B can be equivalently represented by the impedance matching circuit 7 illustrated in FIG. 5. As described above, the RFIC 2 has a parasitic capacitance Cp due to the internal circuit, the stray capacitance, and the like. As illustrated in FIG. 6, two resonances occur in a state where the impedance matching circuit 7 is connected to the RFIC 2. The first resonance is a resonance generated in a current path including the antenna conductors 32a and 32b, an inductor L3, and an inductor L4, and the second resonance is a resonance generated in a current path (e.g., a current loop) including the inductors L1 to L4, the capacitances Ca, Cb, Cca, and Ccb, and the parasitic capacitance Cp. The two resonances are coupled by inductors L3 and L4 shared by the respective current paths, and two currents i1 and i2 respectively corresponding to the two resonances flow as shown in FIG. 5.

In operation, both the first resonance frequency and the second resonance frequency are affected by the inductors L3 and L4. A difference of several 10 MHz (specifically, about 5 to 50 MHz) is generated between the first resonance frequency and the second resonance frequency. These resonance frequency characteristics are expressed by a curve A and a curve B in FIG. 6. By coupling the two resonances having such resonance frequencies, broadband resonance frequency characteristics as indicated by a curve C in FIG. 6 are obtained.

The additional capacitances Cca and Ccb illustrated in FIG. 5 are capacitances generated between the RFIC-side terminal electrodes 11 and 12 and the conductor film 4, and the capacitances Ca and Cb are capacitances generated between the two terminals of the RFIC 2 and the antenna conductors 32LPa and 32LPb. That is, FIG. 5 is a diagram represented by including the impedance matching circuit 7 in the equivalent circuit illustrated in FIG. 3.

With the above-described configuration, the additional capacitances Cca and Ccb are connected to the RFIC 2. Therefore, the loop size of the antenna conductor 32LP required to obtain the predetermined resonance frequency characteristic can be reduced by adding the additional capacitances Cca and Ccb, and the RFID tag 201 can be downsized as a whole accordingly. In addition, for example, even when the RFIC 2 having different internal capacitance components is used for each manufacturer, it is possible to obtain desired electrical characteristics only by changing the additional capacitances Cca and Ccb according to the parasitic capacitance Cp. The capacitances of the additional capacitances Cca and Ccb can be determined by the areas of the conductor films 41 and 42, or by the thickness of the insulator film 3 or further by the dielectric constant of the insulator film 3. Further, after the conductor films 41 and 42 are formed, the additional capacitances Cca and Ccb can be finely adjusted by trimming in an exemplary aspect.

Second Exemplary Embodiment

In the second exemplary embodiment, an RFIC module tag and an RFID tag having a formation position of an additional capacitance different from that of the first embodiment will be exemplified.

Figure 7A:
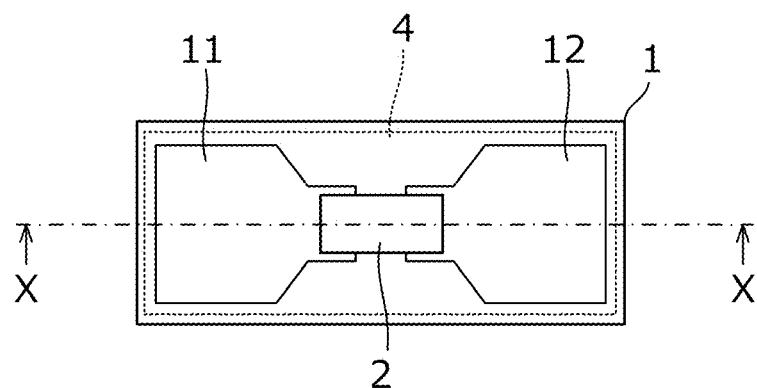
FIG. 7A is a plan view of an RFIC module 102 according to a second exemplary embodiment.
Figure 7B:
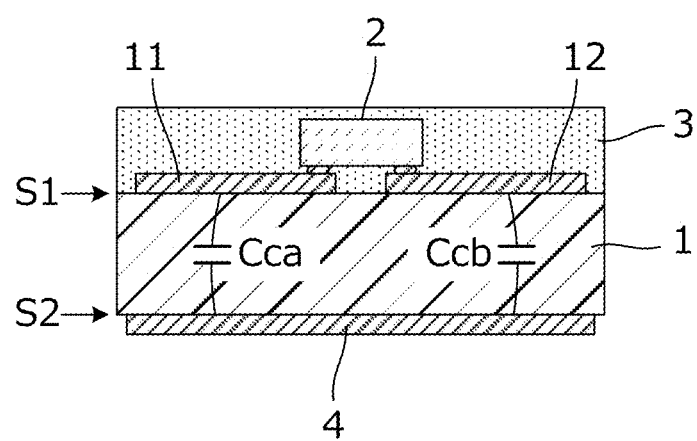
FIG. 7B is a longitudinal sectional view taken along line X-X in FIG. 7A.

FIG. 7A is a plan view of an RFIC module 102 according to the second embodiment, and FIG. 7B is a longitudinal sectional view taken along line X-X in FIG. 7A.

The RFIC module 102 includes a base material 1 having a first face S1 and a second face S2 opposite to each other, an RFIC 2 mounted near and/or above the first face S1 of the base material 1, and RFIC-side terminal electrodes 11 and 12 which are formed on the first face S1 of the base material 1 and to which the RFIC 2 is connected.

An insulator film 3 having a predetermined thickness is formed on the entire surface of the first face S1 of the base material 1. As shown in this embodiment, a conductor film 4 is formed on the second face S2 of the base material 1. Therefore, the conductor film 4 faces the RFIC-side terminal electrodes 11 and 12 via the base material 1. The conductor film 4 is formed by printing and heating and curing Ag paste. Alternatively, conductor film 4 is formed by Cu plating. Other configurations are as described in the first embodiment and not repeated herein.

Since the RFIC-side terminal electrodes 11 and 12 and the conductor film 4 face each other with the base material 1 interposed therebetween, additional capacitances Cca and Ccb are generated between the RFIC-side terminal electrodes 11 and 12 and the conductor film 4, respectively.

Figure 8A:
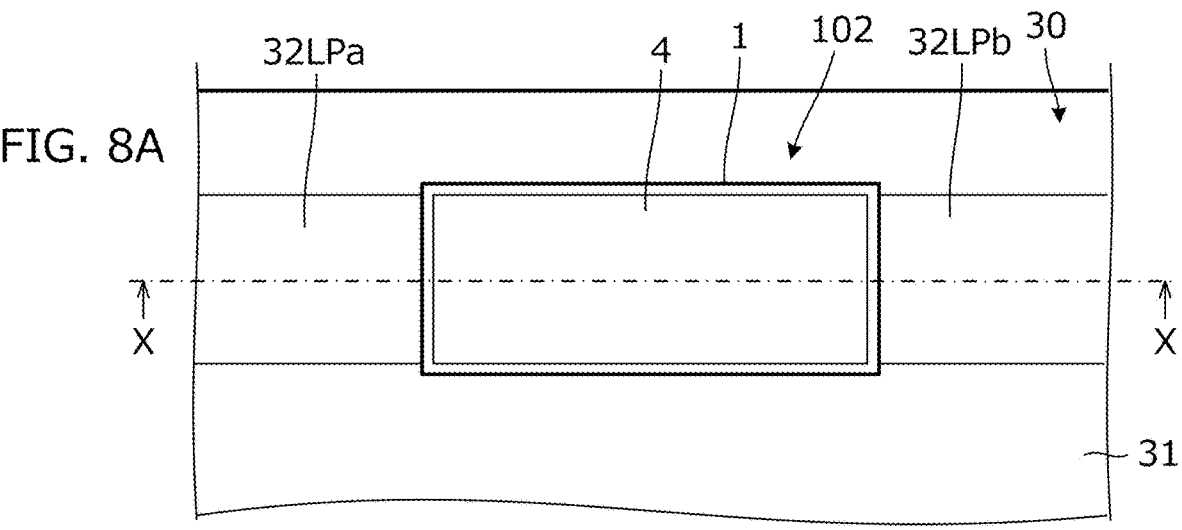
FIG. 8A is a plan view of the RFIC module 102 mounted on the antenna 30.
Figure 8B:
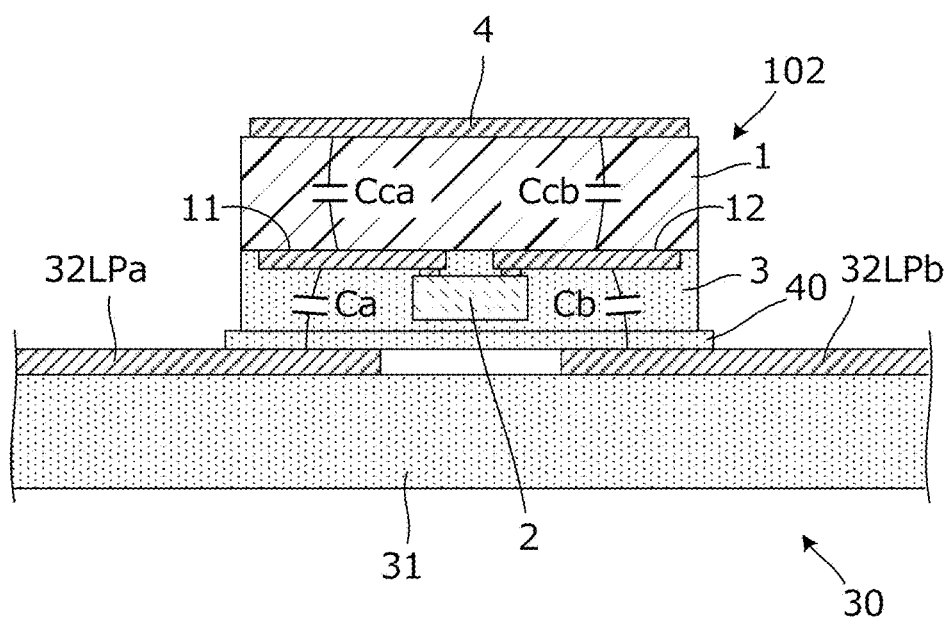
FIG. 8B is a longitudinal sectional view taken along line X-X in FIG. 8A.

FIG. 8A is a plan view of the RFIC module 102 mounted on the antenna 30. FIG. 8B is a longitudinal sectional view taken along line X-X in FIG. 8A. The antenna 30 includes an antenna base material 31 and a conductor pattern formed on the antenna base material 31. The conductor pattern formed on the antenna base material 31 is as described in the first embodiment.

In FIGS. 8A and 8B, the RFIC module 102 is mounted such that the RFIC-side terminal electrodes 11 and 12 face the antenna conductors 32LPa and 32LPb, respectively. In this example, the surface of the insulator film 3 of the RFIC module 102 is bonded on the antenna base material 31 (i.e., on the antenna conductors 32LPa and 32LPb) via the bonding material 40. The bonding material 40 is, for example, an insulating adhesive.

In this manner, the additional capacitances Cca and Ccb can be formed at positions between which the base material 1 is interposed.

Third Exemplary Embodiment

In the third exemplary embodiment, an RFIC module and an RFID tag in which an antenna conductor and an RFIC 2 are connected to each other via an inductor or directly are illustrated.

Figure 9:
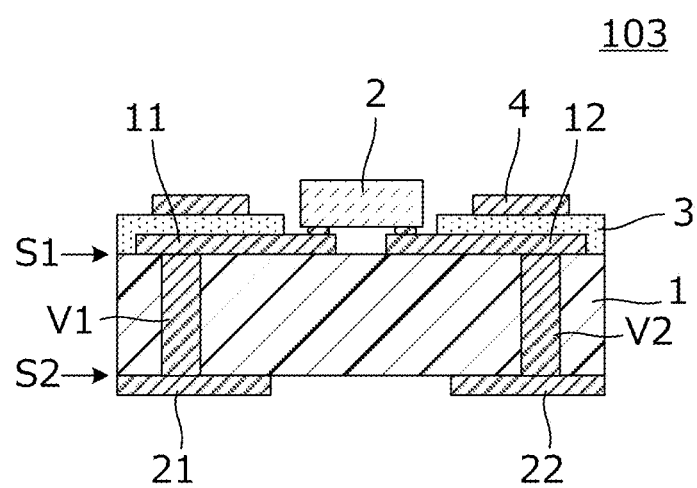
FIG. 9 is a longitudinal sectional view of an RFIC module 103 according to a third exemplary embodiment.

FIG. 9 is a longitudinal sectional view of an RFIC module 103 according to the third embodiment. The RFIC module 103 includes the base material 1 having the first face S1 and the second face S2 opposite to each other, the RFIC 2 mounted near the first face S1 of the base material 1, and the RFIC-side terminal electrodes 11 and 12 which are formed on the first face S1 of the base material 1 and to which the RFIC 2 is connected. As further shown, the insulator film 3 is formed on the surface of each of the RFIC-side terminal electrodes 11 and 12. Moreover, the conductor film 4 is formed on the insulator film 3. The antenna-side terminal electrodes 21 and 22 are formed on the second face S2 of the base material 1. Interlayer connection conductors V1 and V2 respectively connecting the RFIC-side terminal electrodes 11 and 12 and the antenna-side terminal electrodes 21 and 22 are formed inside the base material 1.

Figure 10:
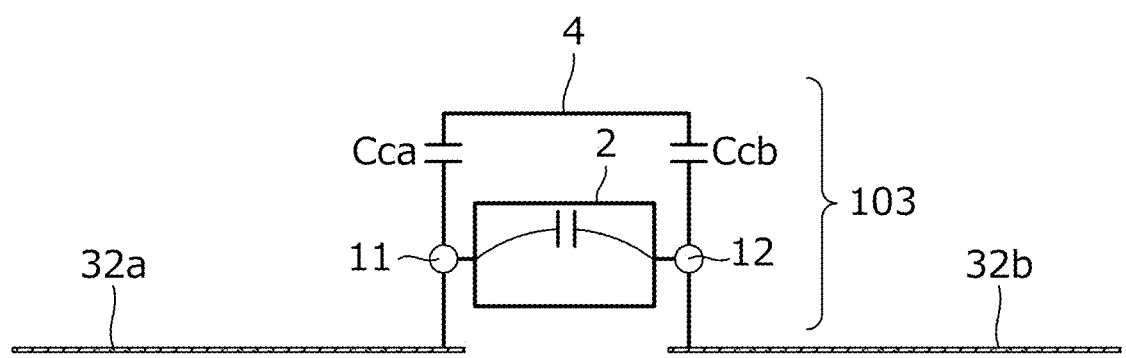
FIG. 10 is a partial equivalent circuit diagram in a state where the RFIC module 103 is mounted on an antenna.

FIG. 10 is a partial equivalent circuit diagram in a state where the RFIC module 103 is mounted on an antenna. The additional capacitances Cca and Ccb are connected via the conductor film 4 between two terminals of the RFIC 2. The additional capacitances Cca and Ccb are capacitances generated between the RFIC-side terminal electrodes 11 and 12 and the conductor film 4. In addition, the two terminals of the RFIC 2 and the antenna conductors 32a and 32b are directly connected via a parasitic inductor.

In this manner, the RFIC module 103 in which the terminals of the RFIC 2 are drawn out to the antenna-side terminal electrodes 21 and 22 through a conductor can be configured, and the RFID tag in which the RFIC module is connected to the antenna conductor via an inductor or directly can be configured.

Finally, it is generally notes that the description of the above-described embodiments is illustrative in all respects and is not restrictive. Modifications and changes can be made as appropriate by those skilled in the art.

REFERENCE SIGNS LIST

Ca, Cb capacitance
Cca, Ccb additional capacitance
Cp parasitic capacitance
L1 to L4 inductor
S1 first face
S2 second face
V1, V2 interlayer connection conductor
1 base material
2 RFIC
3 insulator film
4 conductor film
7 impedance matching circuit
11, 12 RFIC-side terminal electrode
21, 22 antenna-side terminal electrode
30 antenna
31 antenna base material
32 antenna conductor pattern
32a, 32b antenna conductor
32LP, 32LPa, 32LPb antenna conductor
40 bonding material
41, 42, 43 conductor film
101, 102, 103 RFIC module
201 RFID tag

The invention claimed is:

1. An RFIC module comprising:
a base material including a first face and a second face that oppose each other;
an RFIC-side terminal electrode disposed on the first face of the base material;
an RFIC disposed above the first face of the base material and connected to a surface of the RFIC-side terminal electrode;
an insulator film disposed on the surface of the RFIC-side terminal electrode; and
a conductor film disposed on the insulator film and facing the RFIC-side terminal electrode, such that a capacitance is formed between the RFIC-side terminal electrode and the conductor film.

2. The RFIC module according to claim 1, wherein no conductor is disposed inside the insulator film.

3. The RFIC module according to claim 1, further comprising:
an antenna-side terminal electrode disposed on the second face of the base material; and
an interlayer connection conductor extending through the base material to connect the RFIC-side terminal electrode to the antenna-side terminal electrode.

4. An RFIC module comprising:
a base material including a first face and a second face that oppose each other;
an RFIC-side terminal electrode disposed on the first face of the base material;
an RFIC disposed above the first face of the base material and connected to a surface of the RFIC-side terminal electrode;
an insulator film disposed on the surface of the RFIC-side terminal electrode; and
a conductor film disposed on the second face of the base material and facing the RFIC-side terminal electrode, such that a capacitance is formed between the RFIC-side terminal electrode and the conductor film.

5. The RFIC module according to claim 4, wherein no conductor is disposed inside the insulator film.

6. An RFID tag comprising:
an antenna that includes an antenna base material and an antenna conductor pattern disposed on the antenna base material; and
an RFIC module that includes a base material including a first face and a second face that oppose each other, an RFIC-side terminal electrode disposed on the first face of the base material, an RFIC disposed above the first face of the base material and connected to a surface of the RFIC-side terminal electrode, an insulator film disposed on the surface of the RFIC-side terminal electrode, and a conductor film disposed on the insulator film and facing the RFIC-side terminal electrode,
wherein the RFIC module is mounted on the antenna base material.

7. The RFID tag according to claim 6, wherein a capacitance is formed between the antenna conductor pattern and the RFIC-side terminal electrode.

8. The RFID tag according to claim 6, wherein no conductor is disposed inside the insulator film.

9. The RFID tag according to claim 6, wherein the RFIC module further comprises:
an antenna-side terminal electrode disposed on the second face of the base material; and
an interlayer connection conductor extending through the base material to connect the RFIC-side terminal electrode to the antenna-side terminal electrode, and
wherein the antenna conductor pattern and the RFIC-side terminal electrode are connected to each other.

10. The RFID tag according to claim 6, wherein the antenna conductor pattern comprises a pair of antenna conductors with respective ends that face each other along a face of the antenna base material.

11. The RFID tag according to claim 10, wherein the RFIC module is mounted at a position where the pair of antenna conductors face each other.

12. The RFID tag according to claim 11, wherein the RFIC module is mounted to the pair of antenna conductors by a bonding material having a thickness less than a thickness of the base material in a thickness direction of the RFID tag.

13. The RFID tag according to claim 6, wherein the antenna conductor pattern comprises a pair of belt-shaped antenna conductors and a loop-shaped antenna conductor partially having a cutout portion.

14. The RFID tag according to claim 13, wherein a length of the loop-shaped antenna conductor in a direction planar to a surface of the antenna base material is larger than a length of the RFIC module.

15. An RFID tag comprising:
an antenna that includes an antenna base material and an antenna conductor pattern disposed on the antenna base material; and
an RFIC module that includes a base material including a first face and a second face that oppose each other, an RFIC-side terminal electrode disposed on the first face of the base material, an RFIC disposed above the first face of the base material and connected to a surface of the RFIC-side terminal electrode, an insulator film disposed on the surface of the RFIC-side terminal electrode, and a conductor film disposed on the second face of the base material and facing the RFIC-side terminal electrode;

wherein the RFIC module is mounted on the antenna base material with an insulator layer interposed therebetween, such that the first face of the base material faces the antenna base material, and wherein a capacitance is formed between the antenna conductor pattern and the RFIC-side terminal electrode.

16. The RFID tag according to claim 15, wherein no conductor is disposed inside the insulator layer.

17. The RFID tag according to claim 15, wherein the antenna conductor pattern comprises a pair of antenna conductors with respective ends that face each other along a face of the antenna base material.

18. The RFID tag according to claim 17, wherein the RFIC module is mounted at a position where the pair of antenna conductors face each other.

19. The RFID tag according to claim 15, wherein the antenna conductor pattern comprises a pair of belt-shaped antenna conductors and a loop-shaped antenna conductor partially having a cutout portion.

20. The RFID tag according to claim 19, wherein a length of the loop-shaped antenna conductor in a direction planar to a surface of the antenna base material is larger than a length of the RFIC module.

* * * * *